United States Patent [19] [11] Patent Number: 4,848,973
Yokota et al. [45] Date of Patent: Jul. 18, 1989

[54] GROUT MATERIAL AND GROUTING METHOD USING SAME

[75] Inventors: Takayoshi Yokota, Kodaira; Shigekazu Horiya, Sagamihara; Kenji Kita, Ichikawa, all of Japan

[73] Assignee: Kabushiki Kaisha Kumagaigumi, Fukui, Japan

[21] Appl. No.: 210,635

[22] Filed: Jun. 23, 1988

[30] Foreign Application Priority Data

Jul. 10, 1987 [JP] Japan ................. 62-171269
Jul. 11, 1987 [JP] Japan ................. 62-172100
Jul. 13, 1987 [JP] Japan ................. 62-172928

[51] Int. Cl.⁴ .............................................. E02D 3/12
[52] U.S. Cl. ................................. 405/263; 405/264; 166/295
[58] Field of Search ............. 405/263, 264, 266, 267, 405/128; 166/292, 295; 106/494; 428/391

[56] References Cited

U.S. PATENT DOCUMENTS

| 2,822,873 | 2/1958 | Harmsen et al. | 166/292 |
| 3,192,720 | 7/1965 | Schaschl et al. | 405/263 |
| 3,280,912 | 10/1966 | Scheffield, Jr. | 166/292 X |
| 3,373,814 | 3/1968 | Eilers et al. | 166/292 X |
| 3,500,934 | 3/1970 | Magnuson | 405/267 |
| 3,558,335 | 1/1971 | Messenger | 166/292 X |
| 3,927,719 | 12/1975 | Maser | 166/292 X |
| 4,042,031 | 8/1977 | Knapp | 166/295 X |
| 4,231,884 | 11/1980 | Dorius | 252/62 |
| 4,367,986 | 1/1983 | Miyoshi et al. | 166/292 X |
| 4,501,329 | 2/1985 | DePriester | 166/292 |
| 4,540,316 | 9/1985 | Takahashi | 405/264 |
| 4,606,675 | 8/1986 | Mitani et al. | 405/263 |

FOREIGN PATENT DOCUMENTS 60-138112 7/1985 Japan.
61-211417 9/1986 Japan.

Primary Examiner—George A. Suchfield
Attorney, Agent, or Firm—Graybeal, Jensen & Puntigam

[57] ABSTRACT

A grout material comprises a pulverulent body having a silicone coating portion formed on at least a part of the surface of a base material. The particle size of the pulverulent body ranges from 1 to 10 μm. A grouting method using a grout material comprises the steps of boring a hole in a predetermined portion of an area to be grouted, supplying to the hole a powdery grout material containing a pulverulent body having a silicone coating portion formed on at least a part of the surface of a base material and thereby grouting the grout material into the periphery of the hole.

9 Claims, 1 Drawing Sheet

F I G. 1
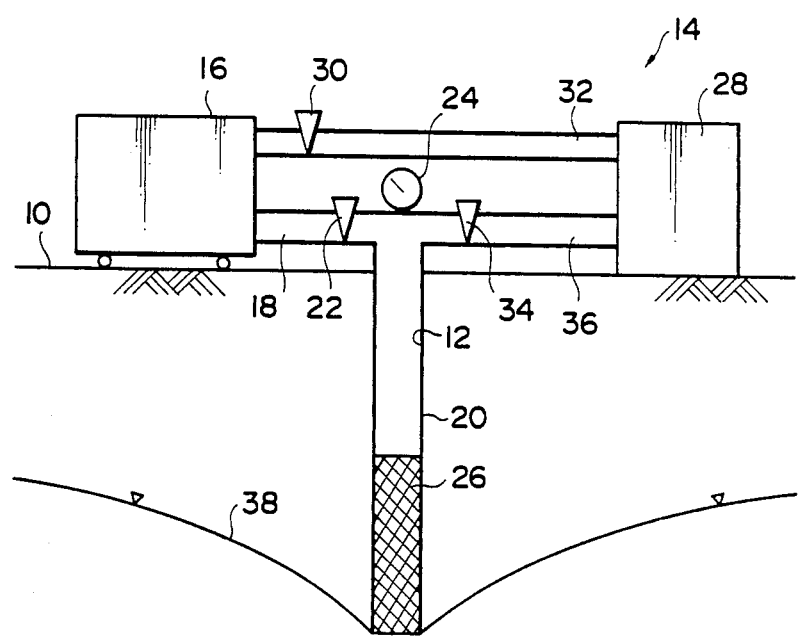

GROUT MATERIAL AND GROUTING METHOD USING SAME

BACKGROUND OF THE INVENTION

1. Field of the Invention:

This invention relates to a grout material suitable for forming a cut-off zone in the ground such as a sand layer, a gravel layer, a silt layer, a soft rock layer and a hard rock layer and for improving a cut-off property of a concrete structure such as a concrete dam and a concrete building, an earth structure such as an embankment and an earth dam and a stone masonry structure or the like and a grouting method using the same.

2. Description of the Prior Art:

Some of grouting methods for forming a cut-off zone in the permeable ground such as a sand layer, a gravel layer, a silt layer, a soft rock layer and a hard rock layer have been disclosed in Japanese Patent Public Disclosure (KOKAI) Nos. 60-138112 and 61-211417. These grouting methods comprise the steps of boring a longitudinal hole in the ground, blowing a grout material such as cement, fly ash and silica in the form of powder into the longitudinal hole, and thereby grouting the grout material into an intustice between ground particles and cracks or the like. As a result, it is possible to give the cut-off property to the ground within a range where the grout material is grouted.

However, since cohesiveness and adhesiveness of the grout material used for the conventional grouting method of this type are high (grout material is liable to be adhesive and cohesive to each other), the grout material is inferior in permeability into the interstice between the ground particles and the cracks or the like, so that grouting of the grout material is not covered over the wide range around the hole.

Therefore, according to the conventional grouting method, since the cut-off property of a grouted portion is degraded, the number of holes per unit area has to increase to grout the grout material into a great number of portions.

Further, since the grout material used for the conventional grouting method of this type is hydrophilic to absorb water during the storage thereof, the quality of the grout material is rapidly degraded.

SUMMARY OF THE INVENTION

It is an object of the present invention to provide a grout material, which can grout in the ground over a wide range around a hole for blowing the grout material, and a grouting method using the same.

Another object of the present invention is to provide a grout material, which is remarkably low in degradation of the quality during the storage thereof, and a grouting method using the same.

A further object of the present invention is to provide a cheap grout material and a grouting method using the same.

A grout material according to the present invention comprises a pulverulent body having a silicone coating portion formed on at least a part of the surface of a base material. The particle size of the pulverulent body preferably ranges from 1 to 10 $\mu$m.

Another grut material according to the present invention comprises a plurality of pulverulent bodies differing from each other in fluidity and kind and mixed with each other.

A further grout material according to the present invention comprises a first pulverulent body having a silicone coating portion formed on at least a part of the surface of a base material and a second pulverulent body mixed with the first pulverulent boyd and having a fluidity and kind different from those of the first pulverulent body. In this case, it is preferable that the particle size of the first pulverulent body ranges from 1 to 10 $\mu$m and the fluidity of the second pulverulent body is inferior to that of the first pulverulent body.

A grouting method according to the present invention comprises the steps of boring a hole in a predetermined portion of an area to be grouted, supplying to the hole a powdery grout material containing a pulverulent body having a silicone coating portion formed on at least a part of the surface of a base material, and thereby grouting the grout material into the periphery of the hole.

Another grouting method according to the present invention comprises the steps of boring a hole in a predetermined portion of an area to be grouted, supplying to the hole a powdery grout material mainly composed of a pulverulent body of 1 to 10 $\mu$m in particle size, and thereby grouting the grout material into the periphery of the hole. In this case, the pulverulent body preferably has a silicone coating portion formed on at least a part of the surface of a base material.

A further grouting method according to the present invention comprises the steps of boring a hole in a predetermined portion of an area to be grouted, supplying to the hole a powdery grout material obtained by mixing a plurality of pulverulent bodies differing from each other in fluidity an kind, and thereby grouting the grout material into the periphery of the hole. In this case, it is preferable that the grout material is mainly composed of a first pulverulent body of 1 to 10 $\mu$m in particle size and having a silicone coating portion formed on at least a part of the surface of a base material and a second pulverulent body having a fluidity inferior to that of the first pulverulent body.

Silicone generally has a semiorganic-semiinorganic bonding structure, in which an organic group (hydrocarbon group) is bonded with the skeleton of siloxane bond (—Si—O—Si—O—). Therefore, since the siloxane bond includes a great deal of non-directional ionic bonds, silicone is very low in intermolecular force. Further, since the organic group belongs to a hydrophobic group, silicone is hydrophobic. Furthermore, since a hyrdocarbon chain acts as slip material, silicone is advantageously high in fluidity.

The powdery grout material having a portion coated with silicone, which is advantageous in many points as noted above, and formed on at least a part of the surface of the base material, is low in cohesiveness and adhesiveness of the grout material surface and is high in fluidity.

Therefore, according to the grouting method using the powdery grout material having the silicone coating portion formed on at least a part of the surface of the base material, since the pulverulent body is permeated into a wide range of the ground, concrete structure, earth structure, stone masonry structure or the like, the grout material is grouted over a wide range around the hole. Further, since the pulverulent body is hydrophobic, the cut-off property is remarkably improved. Furthermore, with the improvement in the fluidity of the pulverulent body, there is no possibility to clog a grouting apparatus with the pulverulent body, so that the workability of the grouting is remarkably improved.

Further, since the hydrophobic grout material is remarkably low in degradation of the quality during storage thereof in comparison with a hydrophilic grout material, the hydrophobic grout material of the present invention is easily stored.

The base material of the pulverulent body may be powder selected from the group consisting of cement, silica, talc, bentonite and fly ash and mixtures thereof.

When the pulverulent body having the base material composed of non-hardening material such as silica, talc, bentonite, fly ash or a mixture thereof is used for the grout material, the cut-off property of the grouted area is improved without hardening. Accordingly, when the grouted area is in the ground or earth structure, the ground or earth structure may be easily excavated after grouting is done.

Further, when the pulverulent body having the base material composed of a hardening material such as cement is used for the grout material, the cut-off property of the grouted ground, concrete structure, earth structure, stone mansory structure or the like is maintained over a short period of time due to the hydrophobic property of the pulverent body. However, in such a case, the ground, earth structure or the like is hardened over a long period of time to close between particles of the ground and earth structure and interstices of the stone mansory structure and cracks existing in the grouted area, so that the cut-off property of the ground, concrete structure, stone mansory structure, earth structure or the like continues to be maintained and the strength of the grouted area is increased.

Particularly, when the pulverulent body having the base material composed of a hydraulic material such as cement is used, this pulverulent body is hardened by water contained in the grouted area or by supplying water to the grouted area after grouting of the pulverulent body is done.

The pulverulent body having the silicone coating portion formed on at least a part of the surface according to the present invention is obtained by coating at least a part of or the entirety of the surface of the powdery base material with silicone, for example.

The smaller the particle size of the powdery grout material is, the higher the adhesiveness and cohesiveness thereof are, particularly in a case of a hydrophilic grout material. More specifically, when the particle size of the grout material is 1 μm or less, the cohesiveness and adhesiveness are sharply increased. On the contrary, the larger the particle size of the grout material is, the lower the permeability of the grout material is into the interstice between the ground particles and cracks.

Thus, the powdery grout material mainly composed of the pulverulent body of 1 to 10 μm in particle size is low in adhesiveness and cohesiveness of the grout material itself and is high in permeability into the interstice between the ground particles and cracks.

Therefore, according to a grouting method using the powdery grout material mainly composed of the pulverulent body of 1 to 10 μm in particle size, the grout material can be grouted over a wide range around a hole for blowing the grout material.

The powdery grout material mainly composed of the pulverulent body of 1 to 10 μm in particle size may somewhat contain a pulverulent body of less than 1 μm and that of 10 μm or more in particle size. However, in this case, the grout material preferably contains 10 % or less of the pulverulent body of less than 1 μm in particle size and 5 % or less of the pulverulent body of 10 μm or more in particle size.

When the pulverulent body of less than 1 μm in particle size exceeds 10 %, the adhesiveness and cohesiveness of the whole grout material are remarkably increased due to these lesser pulverulent particles. On the contrary, when the pulverulent body of 10 μm or more in particle size exceeds 5%, the permeability of the whole grout material is rapidly reduced due to these greater pulverulent particles.

The pulverlent body having the particle size ranging from 1 to 10 μm may use powder selected from the group consisting of cement, silica, talc, bentonite and fly ash and mixture thereof. Further, a pulverulent body having a base material composed of these powder and a silicone coating portion formed on at least a part of the surface of the base material is used for the pulverulent body noted above. The pulverulent body of 1 to 10 μm in particle size and having the silicone coating portion formed on at least a part of the surface of the base material is grouted over a wider range of the ground.

The powdery grout material, mainly compose of a mixture of a plurality of kinds of pulverulent bodies differing from each other in fluidity, is low in adhesiveness and cohesiveness of the grout material itself and is improved in permeability into the interstice between the ground particles and cracks.

Therefore, according to the grouting method using the powdery grout material mainly composed of a mixture of a plurality of kinds of pulverulent bodies differing from each other in fluidity, the grout material is grouted over a wide range around a hole for blowing the grout material. Further, it is not necessary to use a great deal of expensive grout material to reduce the cost thereof.

The mixing ratio of the grout material with high fluidity to that with low fluidity preferably ranges from about 0.5/100 to 10/100. When the mixing ratio exceeds 10/100, the cost of the grout material increases for its effect. On the contrary, when the mixing ratio is less than 0.5/100, it does not lead to any effect on improvement in the permeability.

When a fluidity index and a floodability index of extra fine cement powder were measured according to a Carr method, the results were as follows:
Fluidity index: 26
Floodability index: 53
However, the fluidity index and floodability index of the pulverulent body having the silicone coating portion formed on at least a part of the surface of the extra fine cement powder were as follows:
Fluidity index: 41
Floodability index: 77
Further, the fluidity index and floodability index of fly ash (containing 15% of the pulverulent body of less than 1 μm in particle size) of 10 μm in maximum particle size were as follows:
Fluidity index: 28
Floodability index: 66
However, the fluidity index and floodability index of the pulverulent body with particles less than 1 μm in particle size removed from the pulverulent body of the fly ash noted above, were as follows:
Fluidity index: 35
Floodability index: 67
Further, the fluidity index and floodability index of fine cement (containing 10% of the pulverulent body of less than 1 μm in particle size) of 10 μm in maximum particle size were as follows:
Fluidity index: 26
Floodability index: 77
However, the fluidity index and floodability index of the pulverulent body obtained by mixing 5% of extra fine silica of 0.01 μm in primary particle size with the fine cement noted abpve were as follows:
Fluidity index: 41
Floodability index: 77

BRIEF DESCRIPTION OF THE DRAWING

The foregoing and other objects and features of the invention will become apparent from the following description of a preferred embodiment of the invention with reference to the accompanying drawing, in which:

FIG. 1 is a view showing an embodiment of a grouting apparatus for practice of the present invention.

DESCRIPTION OF THE PREFERRED EMBODIMENT

FIG. 1 illustrates an embodiment of a grouting apparatus for employing a grouting method according to the present invention. Referring to FIG. 1, a hole 12 extending in the longitudinal direction is bored in the ground 10 and adapted for grouting a grout material.

A grouting apparatus 14 installed on the ground comprises a compressor 16. The compressor 16 supplies compressed air to the grouting hole 12 through a blast pipe 18 connected with the compressor and a grouting pipe 20 connected with the grouting hole 12. The blast pipe 18 is provided with a flow adjusting valve 22, so that pressure of the compressed air supplied from the compressor 16 to the grouting hole 12 can be adjusted by the valve 22. The grouting pipe 20 is provided with a pressure gauge 24 indicating the pressure in the grouting hole 12. The grouting pipe 20 includes a strainer 26 provided on the bottom of the grouting hole 12.

The grouting apparatus 14 further comprises a grout material feeding machine 28. The grout material feeding machine 28 accommodates a powdery grout material mainly composed of a pulverulent body having a silicone coating portion formed on at least a part of the surface of a base material composed of a powdery material, a powdery grout material mainly composed of a pulverulent body of 1 to 10 μm in particle size, or a powdery grout material mainly composed of a mixture of a plurality of pulverulent bodies differing from each other in fluidity and kind.

The grout material mainly composed of the pulverulent body having the silicone coating portion formed on at least a part of the surface of the base material may use a material having a base material composed of a powdery material selected from the group consisting of cement, silica, talc, bentonite and fly ash and mixtures thereof as described above and a silicone coating film formed on the surface of the base material.

The grout material mainly composed of the pulverulent body of 1 to 10 μm in particle size may use a powdery material itself selected from the group consisting of cement, silica, talc, bentonite and fly ash and mixtures thereof, which are classified such that the particle size ranges from 1 to 10 μm. Further, a grout material mainly composed of the pulverulent body of 1 to 10 μm in particle size and having a base material composed of the powdery material as noted above and a silicone coating film formed on the surface of the base material is preferably used for the grout material noted above.

The grout material mainly composed of the mixture of a plurality of pulverulent bodies differing from each other in fluidity and kind may use a mixture of two or more powdery materials selected from the group consisting of cement, silica, talc, bentonite and fly ash. In this case, it is possible to use a mixture of a first pulverulent body mainly composed of a pulverulent body having a base material composed of the powdery material as noted above and a silicone coating portion formed on the surface of the base material by means of coating or the like or a pulverulent body of 1 to 10 μm in particle size and a second pulverulent body mainly composed of a different powdery material having a fluidity inferior to that of the first pulverulent body. Particularly, a pulverulent body having a base material composed of the powdery material as noted above and a silicone coating portion formed on the surface of the base material by means of coating or the like and of 1 to 10 μm in particle size is preferably used for the first pulverulent body.

The grout material feeding machine 28 is connected with the compressor 16 through a pipe 32 provided with a pressure regulating valve 30 and is connected with the grouting pipe 20 through a pipe 36 provided with a pressure regulating valve 34. The grout material feeding machine 28 blows the stored grout material, together with the compressed air supplied from the compressor 16 through the pipe 32, into the grouting hole 12 through the pipes 36, 20.

At the time of grouting, the grouting apparatus 14 supplies the compressed air by the compressor 16 to the grouting hole 12 through the pipes 18, 20. Thereby, the ground-water level is lowered as shown by a reference numeral 38 to form an air passage in the ground 10. The pressure of the compressed air and the blasting time are set to such value to prevent the ground 10 from being broken by rising of the ground and generation of cracks.

A fact that the air passage is formed is confirmed by monitoring the pressure gauge 24 of the pipe 18, for example, since the pressure in the grouting hole 12 and the flow rate of the compressed air are sharply changed when the air passage is formed.

After the air passage is formed, the grout material stored in the grout material feeding machine 28, together with the compressed air supplied from the compressor 16 through the pipe 32, is blown by the grout material feeding machine 28 into the grouting hole 12 through the pipes 36, 20.

Thus, the grout material is blown in toward the deepest portion of the air passage by the compressed air to grout over a wide range around the hole 12. As a result, the grout material thus grouted successively closes the air passage of ground particles in the range noted above from the deepest portion thereof to form a cut-off zone together with the ground particles.

This is because the grout material, mainly composed of the pulverulent body having the silicone coating portion formed on at least a part of the surface has improved in quality so as to be low in adhesiveness and cohesiveness of the grout material surface. Further, this is because the grout material mainly composed of the pulverulent body of 1 to 10 μm in particle size and the grout material mainly composed of the mixture of a plurality of pulverulent bodies differing from each other in fluidity and kind are low in cohesiveness and adhesiveness of the grout material itself and hence is low in adhesiveness and cohesiveness of the grout material surface.

Further, the grout material may be supplied to the grouting hole 12 together with a different kind of gas instead of the compressed air. Further, dried compressed air may be used for the compressed air noted above. In this case, the air passage is formed for a short period of time and the pulverulent body of the grout material is permeated into a deeper portion of the air passage, compared with a case when using non-dried compressed air.

Next, examples of execution and comparative examples of the grouting method according to the present invention will be explained.

Examples of Execution 1A, 1B

A grouting hole of 70 mm in diameter and 30 m in depth was bored in a soft rock layer (having the coefficient of permeability of $5 \times 10^{-4}$ cm/s, and consisting of non-solid tuff layer) and a pipe having a packer disposed at a portion corresponding to a depth of 25 m of the grouting hole was inserted into the grouting hole. Subsequently, compressed air was blown into the grouting hole from a position at a height of 5 m from the bottom of the grouting hole for 30 minutes at a gauge pressure of 3 kg/cm². Then, a pulverulent body having a silicone coating portion formed on the surface of a powdery base material as shown in Table 1 was used for a powdery grout material to blow into the grouting hole together with the compressed air for 60 minutes at a gauge pressure of 3 kg/cm², and the resultant was allowed to stand for 10 days.

As a result, a cut-off zone was formed in the ground around the grouting hole within a radius as shown in Table 1. This cut-off zone was rigidly solidified in a case of Example 1A. Further, the coefficient of permeability of the cut-off zone was as shown in Table 1.

Comparative Examples 1a, 1b

Grouting was executed in the same soft rock layer under the same conditions as Examples 1A, 1B, except that a pulverulent body having no silicone coating film as shown in Table 1 was used for the powdery grout material.

As a result, a cut-off zone was merely formed in the ground around the grouting hole within a range as shown in Table 1. The coefficient of permeability was as shown in Table 1.

TABLE 1

|  |  | Maximum particle size (μm) | Average particle size (μm) | Radius (m) | Coefficient of permeability (cm/s) |
| --- | --- | --- | --- | --- | --- |
|  | Base material |  |  |  |  |
| Example of execution 1A | Fine cement | 15 | 4 | 7.5 | $1 \times 10^{-5}$ |
| Example of execution 1B | Talc | 7 | 3 | 6.5 | $8 \times 10^{-5}$ |
|  | Pulverulent body |  |  |  |  |
| Comparative example 1a | Fine cement | 15 | 4 | 0.5 | $2 \times 10^{-5}$ |
| Comparative example 1b | Talc | 7 | 2 | 2.5 | $1 \times 10^{-4}$ |

EXAMPLES OF EXECUTION 2A, 2B

A pipe of 60 mm in diameter, which was provided with a strainer from a lower end portion to a height of 5 m, was vertically disposed in the earth ground (having a coefficient of permeability of $8 \times 10^{-4}$ cm/s) to a depth of 20 m. Subsequently, the pipe was adapted for a grouting hole. A pulverulent body having a silicone coating film formed on the surface of a powdery base material as shown in Table 2 was used for a powdery grout material to blow into the grouting hole together with compressed air for 60 minutes at a gauge pressure of 1 kg/cm².

As a result, the permeation length of the grout material into the earth ground was as shown in Table 2.

Comparative Examples 2a, 2b

Grouting was executed in the same earth ground under the same conditions as Examples 2A, 2B, except that a pulverulent body having no silicone coating film as shown in Table 2 was used for the powdery grout material.

As a result, the permeation length of the grout material into the earth ground was merely as shown in Table 2.

TABLE 2

|  |  | Maximum particle size (μm) | Average particle size (μm) | Permeation length (m) |
| --- | --- | --- | --- | --- |
|  | Base material |  |  |  |
| Example of execution 2A | Fine cement | 15 | 4 | 25 |
| Example of execution 2B | Talc | 7 | 3 | 18 |
|  | Pulverulent body |  |  |  |
| Comparative example 2a | Fine cement | 15 | 4 | 0.2 |
| Comparative example 2b | Talc | 7 | 2 | 0.8 |

EXAMPLE OF EXECUTION 3

A pipe of 60 mm in diameter, which was subjected to provided with a strainer from a lower end portion to a height of 5 m, was vertically disposed in the earth ground (having a coefficient of permeability of $2 \times 10^{-3}$ cm/s) a depth of 20 m. Subsequently, the pipe was adapted for the grouting hole and compressed air was blown into the grouting hole for 30 minutes at a gauge pressure of 2 kg/cm². Then, fine cement (containing particles of less than 1 μm and of 10 μm or more in proportions as shown in Table 3) classified so as to otherwise be comprised of fine cement particles which are 1 to 10 μm in particle size, was used for a powdery grout material to blow into the grouting hole together with compressed air for 60 minutes at a gauge pressure of 2 kg/cm² and the resultant was allowed to stand for three days.

As a result, a cut-off zone was formed in the ground around the grouting hole within a radius as shown in Table 3. The coefficient of permeability of this cut-off zone was as shown in Table 3. In this case, the cut-off zone was rigidly solidified.

Example of Execution 4

Grouting was executed in the same earth ground under the same conditions as Example 3, except that a pulverulent body composed of fine cement powder (containing particles of less than 1 μm and of 10 μm or more in proportions as shown in Table 3) classified so as to otherwise be comprised of powder of 1 to 10 μm in particle size and having a silicone coating film on the surface of the fine cement was used for the grout material.

As a result, a cut-off zone was formed in the ground around the grouting hole within a radius as shown in Table 3. The coefficient of permeability of this cut-off zone was as shown in Table 3. In this case, the cut-off zone was also rigidly solidified.

Comparative Example 3

Grouting was executed in the same earth ground under the same conditions as Example 3, except that fine cement (provided that it contains containing particles of less than 1 μm and the pulverulent body of 10 μm or more in proportions as shown in Table 3) was used for the powdery grout material.

As a result, a cut-off zone was merely formed in the ground around the grouting hole within a radius as shown in Table 3. The coefficient of permeability of this cut-off zone was as shown in Table 3. In this case, the cut-off zone was rigidly solidified.

Comparative Example 4

Grouting was executed in the same earth ground under the same conditions as Example 3, except that a pulverulent body (containing particles of less than 1 μm and body of 10 μm or more in proportions as shown in Table 3) having a silicone coating film formed on the surface of fine cement was used for the powdery grout material.

As a result, a cut-off zone was merely formed in the ground around the grouting hole within a radius as shown in Table, 3. The coefficient of permeability of this cut-off zone was as shown in Table 3. In this case, the cut-off zone was rigidly solidified.

TABLE 3

|  | Pulverulent body of less than 1 μm in particle size (%) | Pulverulent body of 10 μm or more in particle size (%) | Radius (m) | Coefficient of permeability (cm/s) |
| --- | --- | --- | --- | --- |
| Example of execution 3 | 10 | 2 | 2 | $2 \times 10^{-5}$ |
| Example of execution 4 | 8 | 5 | 20 | $2 \times 10^{-5}$ |
| Comparative example 3 | 15 | 10 | 1 | $2 \times 10^{-5}$ |
| Comparative example 4 | 35 | 0 | 4 | $2 \times 10^{-5}$ |

EXAMPLES OF EXECUTION 5A, 5B

A pipe of 60 mm in diameter, provided with a strainer from a lower end portion to a height of 5 m, was vertically disposed in the earth ground (having the coefficient of permeability of $8 \times 10^{-4}$ of cm/s) to a depth 20 m. Subsequently, the pipe was adapted for a grouting hole. A pulverulent body containing particles of less than 1 μm and of 10 μm or more in quantity as shown in Table 4) classified so as to be mainly composed of a pulverulent body of 1 to 10 μm in particle size as shown in Table 4 was used for a powdery grout material to blow into the grouting hole together with compressed air for 60 minutes at a gauge pressure of 1 kg/cm².

As a result, the permeation length of the grout material into the earth ground was as shown in Table 4.

Comparative Examples 5a through 5g

Grouting was executed in the same earth ground under the same conditions as Examples 5A, 5B, except that a pulverulent body containing the pulverulent body of less than 1 μm and the pulverulent body of 10 μm or more in the proportions, as shown in Table 4 was used for the grout material.

As a result, the permeation length of the grout material into the earth ground was as shown in Table 4. Further, the reason why the range and coefficient of permeability of the cut-off zone formed according to Comparative Example 4 were better than those according to Example 3 is presumed by a fact that the pulverulent body having the silicone coating film formed on the surface of the base material was used for the grout material in Comparative Example 4.

TABLE 4

|  | Grout material | Pulverulent body of less than 1 μm in particle size (%) | Pulverulent body of 10 μm or more in particle size (%) | Permeation length (m) |
| --- | --- | --- | --- | --- |
| Example of execution 5A | Fine cement | 10 | 2 | 0.6 |
| Example of execution 5B | Fly ash | 8 | 3 | 1.5 |
| Comparative example 5a | Normal cement | 5 | 80 | 0 |
| Comparative example 5b | Fine cement | 35 | 0 | 0.2 |
| Comparative example 5c | Fine cement | 15 | 10 | 0.2 |
| Comparative example 5d | Fine cement | 20 | 0 | 0 |
| Comparative example 5e | Fine cement | 6 | 6 | 0.3 |
| Comparative example 5f | Fly ash | 3 | 70 | 0 |
| Comparative example 5g | Fly ash | 15 | 0 | 0.6 |

EXAMPLES OF EXECUTION 6A, 6B

A pipe of 60 mm in diameter, provided with a strainer from a lower end portion to a height of 5 m, was vertically disposed in the earth ground (having the coefficient of permeability of $2 \times 10^{-3}$ cm/s) to a depth of 20 m. Subsequently, the pipe was adapted for a grouting hole and compressed air was blown into the grouting hole for 30 minutes at a gauge pressure of 2 kg/cm². Then, a mixture of fine cement (pulverulent body a) of 15 μm in maximum particle size and of 4 μm in average particle size and hydrophobic extra fine silica (pulverulent body b) of 0.01 μm in primary particle size was used for a powdery grout material to blow into the grouting hole together with the compressed air for 60 minutes at a gauge pressure of 2 kg/cm², and the resultant was allowed to stand for three days.

As a result, a cut-off zone was formed in the ground around the grouting hole within a radius as shown in Table 5. The coefficient of permeability of the cut-off zone was as shown in Table 5. In this case, the cut-off zone was rigidly solidified.

EXAMPLE OF EXECUTION 7

Grouting was executed in the same earth ground under the same conditions as Examples 6A, 6B, except that a mixture (containing 10 % or less of the pulverulent body of less than 1 μm in particle size and 5 % or less of the pulverulent body of 10 μm or more in particle size) of powder (pulverulent body a) of 1 to 10 μm in particle size and having a silicone coating film formed in the surface of fine cement, and fine cement (pulverulent body b) was used for the grout material.

As a result, a cut-off zone was formed in the ground around the grouting hole within a radius as shown in Table 5. The coefficient of permeability of this cut-off zone was as shown in Table 5. In this case, the cut-off zone was rigidly solidified.

COMPARATIVE EXAMPLE 6

Grouting was executed in the same earth ground under the same conditions as Examples 6A , 6B, except that fine cement of 4 μm in average particle size and of 15 μm in maximum particle size was used for the powdery grout material.

As a result, a cut-off zone was merely formed in the ground around the grouting hole within a radius as shown in Table 5. The coefficient of permeability of this cut-off zone was as shown in Table 5. In this case, the cut-off zone was rigidly solidified.

TABLE 5

|  | Mixing ratio (a:b) | Radius (m) | Coefficient of permeability (cm/s) |
| --- | --- | --- | --- |
| Example of execution 6A | 1:0.05 | 3.5 | $1 \times 10^{-5}$ |
| Example of execution 6B | 1:0.01 | 1.5 | $1 \times 10^{-5}$ |
| Example of execution 7 | 0.1:1 | 4 | $1 \times 10^{-5}$ |
| Comparative example 6 | (not mixed) | 1 | $2 \times 10^{-5}$ |

What is claimed is:

1. A grouting method comprising the steps of:
   forming a hole in a predetermined portion of an area to be grouted;
   supplying to said hole by sustained gas pressure a powdery grout material containing a pulverulent body having a silicone coating portion formed on at least a part of the surface of a base material;
   thereby grouting said grout material into the periphery of said hole.

2. A grouting method according to claim 1, wherein said grout material contains a pulverulent material mixed with said pulverulent body having a coating portion and differing from said pulverulent body having a coating portion in a fluidity and kind.

3. A grouting method according to claim 2, wherein said pulverulent body having a coating portion has a particle size ranging from 1 to 10 μm and wherein the fluidity of said pulverulent material is inferior to that of said pulverulent body having a coating portion.

4. A grouting method according to claim 1, wherein the base material of said pulverulent body having a coating portion is selected from the group consisting of cement, silica, talc, bentonite and fly ash and mixtures thereof.

5. A grouting method according to claim 1, wherein the base material of said pulverulent body having a coating portion is fine cement.

6. A grouting method comprising the steps of:
   boring hole in a predetermined portion of a ground area to be grouted;
   supplying to said hole by sustained gas pressure a powdery grout material mainly comprising a pulverulent body of 1 to 10 μm in particle size and wherein said pulverulent body has a silicone coating portion formed on at least a part of the surface of a base material; and
   allowing the grout material to harden, thereby grouting said grout material into the periphery of said hole.

7. A grouting method according to claim 6, wherein the sustained gas pressure is caused by dried compressed air applied in the bore hole for at least thirty minutes.

8. A grouting method according to claim 7, wherein the grouting material mainly comprises silicone coated fine cement particles.

9. A grouting method according to claim 8, wherein the silicone coated fine cement particles, measured according to the Carr method, exhibit a fluidity index of at least about 41 and a floodability index of at least about 77.

* * * * *